United States Patent
Trivino et al.

(10) Patent No.: US 11,212,239 B2
(45) Date of Patent: Dec. 28, 2021

(54) METHOD AND SYSTEM FOR PUSHING A NEW RACK INTO OPERATIONAL MODE IN A DATACENTER

(71) Applicant: OVH, Roubaix (FR)

(72) Inventors: Gaetan Trivino, Lille (FR); Jeremie Denechaud, Lille (FR); Guillaume Maurice Palmyre Pecourt, Amiens (FR)

(73) Assignee: OVH, Roubaix (FR)

( * ) Notice: Subject to any disclaimer, the term of this patent is extended or adjusted under 35 U.S.C. 154(b) by 0 days.

(21) Appl. No.: 16/996,095

(22) Filed: Aug. 18, 2020

(65) Prior Publication Data
US 2021/0067469 A1 Mar. 4, 2021

(30) Foreign Application Priority Data
Aug. 29, 2019 (EP) ..................... 19315105

(51) Int. Cl.
*H04L 12/931* (2013.01)
*H04L 12/24* (2006.01)
*H04L 12/933* (2013.01)

(52) U.S. Cl.
CPC ............ *H04L 49/356* (2013.01); *H04L 41/12* (2013.01); *H04L 49/15* (2013.01)

(58) Field of Classification Search
CPC . H04L 49/15; H04L 41/0806; H04L 41/0886; H04L 49/356; H04L 41/12
See application file for complete search history.

(56) References Cited

U.S. PATENT DOCUMENTS

| 10,521,273 | B2* | 12/2019 | Mullender | ............ G06F 9/5061 |
| 2009/0181659 | A1* | 7/2009 | Stalnacke | ............... H04L 12/66 455/416 |
| 2015/0156183 | A1* | 6/2015 | Beyer | ..................... H04L 63/08 726/4 |

(Continued)

OTHER PUBLICATIONS

European Search Repod with regard to the counterpart European Patent Application No. 19315105.7 completed Nov. 12, 2019.

(Continued)

*Primary Examiner* — Syed Ali
(74) *Attorney, Agent, or Firm* — BCF LLP (57) ABSTRACT

A new rack equipped with at least one ToR switch is pushed into operational mode in a datacenter equipped with at least one operational datacenter switch. A script server fetches from a database information about a first networking configuration of the datacenter switch, and a minimal profile information of the rack. The script server devises a physical cabling plan between the ToR switch and the datacenter switch, reserves ports on the datacenter switch, computes and stores into the database enriched information of the rack, and provides cabling instructions relative to the physical cabling plan to a datacenter technician. The script server fills-in a configuration template, and causes a configuration builder to apply a first networking configuration of the ToR switch, applies a second networking configuration to the datacenter switch, pushes the rack into production, completes a second networking configuration of the ToR switch, and pushes the rack into operational mode.

15 Claims, 5 Drawing Sheets

(56) References Cited

U.S. PATENT DOCUMENTS

| | | | |
|---|---|---|---|
| 2016/0091685 A1* | 3/2016 | Raza | G02B 6/4452 |
| | | | 398/19 |
| 2016/0156522 A1 | 6/2016 | Jubran et al. | |
| 2016/0366019 A1 | 12/2016 | Pani et al. | |
| 2017/0236123 A1* | 8/2017 | Ali | G06Q 20/3825 |
| | | | 705/75 |
| 2017/0295414 A1* | 10/2017 | Murray | H04N 21/8583 |
| 2018/0174259 A1* | 6/2018 | Hodge | G06F 16/285 |
| 2019/0020568 A1 | 1/2019 | Kommula et al. | |
| 2019/0097948 A1* | 3/2019 | Browne | H04L 49/9057 |
| 2019/0171601 A1 | 6/2019 | Nachimuthu et al. | |
| 2019/0318100 A1* | 10/2019 | Bhatia | H04L 63/1425 |

OTHER PUBLICATIONS

"Day Zero Automation", https://developer.cisco.com/docs/ios-xe/#!day-zero-provisioning-quick-stari-guide/day-zero-automation, accessed on Aug. 15, 2020, pdf 3 pages.

"Zero-Touch Provisioning", DHCP Server Configuration for Zero-Touch Provisioning, https://www.cisco.eom/c/en/US/td/docs/switches/lan/catalyst3650/software/release/16-5/configuration_guide/prog/b_165_prog_3650_cg/zero_touch_provisioning.pdf, accessed on Aug. 15, 2020, pdf 6 pages.

"Zero Touch Provisioning Overview", TechLibrary—Juniper Networks, 2019, https://www.juniper.net/documentation/en_US/cso4.1/topics/concept/cso-based-ztp-overview.html, accessed on Aug. 15, 2020, pdf 3 pages.

"Arista Zero Touch Provisioning", Solution Brief, https://www.arista.com/assets/data/pdf/TechBulletins/Tech_bulletin_ZTP.pdf, accessed on Aug. 15, 2020, pdf 4 pages.

\* cited by examiner

METHOD AND SYSTEM FOR PUSHING A NEW RACK INTO OPERATIONAL MODE IN A DATACENTER

CROSS-REFERENCE

The present application claims priority from European Patent Application No. 19315105.7, filed on Aug. 29, 2019, the entirety of which is incorporated by reference herein.

FIELD

The present technology relates to computer-implemented methods and systems in general and specifically to a method and system for pushing a new rack into operational mode in a datacenter.

BACKGROUND

In a datacenter, the deployment of additional computing or storage capabilities may be done through the addition of software and/or hardware, such as those implemented in a rack. When a new rack is physically delivered to the datacenter, it may be internally wired so that all components in the rack are interconnected. However, for the new rack to become operational in the datacenter, it needs to be both physically wired, and logically configured so as to function with the rest of the existing hardware and software in the datacenter.

SUMMARY

It has been appreciated by the developers of the present technology that the switches on the rack need to be both physically wired, and logically configured so as to send and receive data to and from other switches in the datacenter network.

It has also been appreciated by the developers of the present technology that this physical wiring and logical configuring usually is a cumbersome (e.g., long, prone to errors) process involving significant manual intervention.

As such, the developers have developed technology, a first broad aspect of it is a method for pushing a new rack equipped with at least one ToR switch into operational mode in a datacenter equipped with at least one datacenter switch that is in operational mode, comprising:
fetching by a script server from a database:
information about a first networking configuration of the datacenter switch; and
a minimal profile information of the new rack;
devising by the script server, based on the information about the first networking configuration of the datacenter switch and the minimal profile information of the new rack, a physical cabling plan between the ToR switch and the datacenter switch;
reserving by the script server ports on the datacenter switch;
computing and storing by the script server into the database enriched information of the new rack;
providing by the script server cabling instructions relative to the physical cabling plan to a datacenter technician;
filling-in by the script server, based on information about the first networking configuration of the datacenter switch, and the minimal profile information and the enriched information of the new rack, a configuration template and sending it to a configuration builder;
pushing by the configuration builder upon query by the script server a first networking configuration of the ToR switch based on the filled-in configuration template;
computing and applying by the script server based on the enriched information of the new rack and information about the first networking configuration of the datacenter switch, a second networking configuration to the datacenter switch;
pushing by the script server the new rack into production;
completing by the script server a second networking configuration of the ToR switch; and
pushing by the script server the new rack into operational mode in the datacenter.

In an embodiment of the technology, the method further comprises: comparing by the script server the minimal profile information of the new rack with standard values for the corresponding rack profile, and if there is no identity between the two, stopping the method.

In another embodiment, the method further comprises: performing by the script server a conformity check that the cabling instructions relative to the physical cabling plan have been accurately followed by the datacenter technician, and if not, warning the datacenter technician of the non-conformity and requesting re-cabling.

In yet another embodiment, the method further comprises: performing by the script server an identity check between actual routing tables and BGP neighbors of the ToR switches with the computed second networking configuration to the datacenter switch, and if there is no identity between the two, stopping the method.

In yet another embodiment of the method, the minimal profile information of the new rack comprises a port-aggregation scheme which refers to a set of datacenter internal rules and constraints related to best practices for achieving load balancing, redundancy or resiliency in the datacenter.

In yet another embodiment of the method, the devising by the script server a physical cabling plan, takes into account a set of datacenter internal rules and constraints relative to cabling conventions.

In yet another embodiment of the method, the providing by the script server cabling instructions comprises graphically representing the cabling on a user interface to the datacenter technician.

In yet another embodiment of the method, the graphically representing comprises showing an augmented reality to aid the datacenter technician with the cabling.

In yet another embodiment, the method further comprises:
affixing a serial number on the new rack at the time of its manufacturing and assembly; and
associating in a rack assembly database the serial number with the minimal profile information of the new rack;
and the fetching by a script server the minimal profile information of the new rack comprises retrieving the minimal profile information of the new rack from the rack assembly database.

In yet another embodiment of the method, the datacenter switch is part of a spine, and the ToR switch becomes part of a leaf after being pushed into operational mode, in a spine-leaf networking topology of the datacenter.

In another broad aspect, the technology includes a processor configured to execute the foregoing method.

In an embodiment of the processor, the script server and the configuration builder are integrated in a single information handling system.

In another embodiment of the processor, the script server and the database are integrated in a single information handling system.

In yet another embodiment of the processor, the script server, the configuration builder and the database are integrated in a single information handling system.

In yet another embodiment of the processor, the new rack is equipped with at least two ToR switches, and a Multi Chassis Link Aggregation is established between the two ToR switches.

In another broad aspect, the technology includes a non-transitory computer-readable medium comprising instructions causing to perform the foregoing method.

In the context of the present specification, the expression "information" includes information or intelligence of any nature or kind whatsoever capable of being stored in a database. Information includes, without limitation, audiovisual works (images, movies, sound records, presentations etc.), data (location data, numerical data, etc.), text (opinions, comments, questions, messages, etc.), documents, spreadsheets, lists of words, etc.

In the context of the present specification, a "database" is any structured collection of data, irrespective of its particular structure, the database management software, or the hardware, whether dedicated or not, on which the data is stored, implemented or otherwise rendered available for use by a machine.

In the context of the present specification, an "Information Handling System" or "IHS" is intended to include any instrumentality or aggregate of instrumentalities operable to compute, classify, process, transmit, receive, retrieve, originate, switch, store, display, manifest, detect, record, reproduce, handle, or utilize information. For example, an IHS may be without limitation a computer, a smart phone, a server, a processor, or a networking device. An IHS may include a variety of hardware and software components, with a general purpose or configured for a specific user or use. An IHS may include one or more processing resources for executing machine-executable code, such as a central processing unit or other control logic. An IHS may also include, without limitation, one or more machine-readable storage devices for storing machine-executable code or a database, one or more communication ports for communicating with other processing resources, and various input and output devices, such as a keyboard, a mouse, or a display.

In the context of the present specification, a "processor" is intended to include an IHS that is running software on appropriate hardware operable to perform functions such as information computing, data storage or networking service over a network, and carrying out those requests, or causing those requests to be carried out. The hardware may be dedicated hardware, or generic hardware capable of executing software. When carried out, or caused to be carried out, the functions may be provided by a single dedicated processor, by a single shared processor, or by a plurality of individual processors, some of which may be shared. Moreover, use of the term "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

In the context of the present specification, a "server" is intended to include a processor that is running software on appropriate hardware operable to receive from another IHS (e.g., client devices) requests to perform functions such as information computing, data storage or networking service over a network, and carrying out those requests, or causing those requests to be carried out.

In the context of the present specification, the expression "datacenter" is intended to include a facility for housing clustered IHS, such as servers, and associated components such as networking and storage devices, to form an infrastructure that an organization deploys, controls and maintains to provide information computing, data storage and networking services, for its own internal consumption and/or that of other organizations.

In the context of the present specification, the expression "switch" is intended to include an IHS that is running software on appropriate hardware operable to connect to another switch or a server, and to transport data to and from such other switch or server at least at one of the data link layer (L2) or network layer (L3) of the OSI model. "Operational mode" relative to a particular switch, refers to a switch that is fully configured and active and transports data according to at least one of the L2 or L3 protocols to support traffic requirements with another switch or server.

In the context of the present specification, the expression "rack" is intended to include a stand-alone physical unit populated with IHS, including at least one or more servers, one or more Top of the Rack (ToR) switches, and the necessary interconnections between them so as to allow the rack, when deployed and configured, to perform a particular service such as information computing, data storage or networking, within a datacenter. ToR switches generally interconnect servers within the rack, and with other IHS outside of the rack in the datacenter. For example, a rack may include 48 servers and 2 ToR switches, with each server having 2 uplinks to each of the 2 ToR switches, and with each ToR switch having 100 ports, i.e. 96 for the 48 servers, plus 2 for the other ToR switch on the rack plus 2 uplinks to networking devices outside of the rack in the datacenter. A "new rack", relative to a particular datacenter, refers to a rack that has yet to be pushed into operational mode in that particular datacenter. "Operational mode" relative to a particular rack, refers to a rack whose ToR switches are in operational mode.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Detailed embodiments of the claimed methods and systems are disclosed herein; however, it can be understood that the disclosed embodiments are merely illustrative of the claimed methods and systems that may be embodied in various forms. This technology may, thus, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but all embodiments may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of the person skilled in the art to affect such feature, structure, or characteristic in connection with other embodiments whether or not explicitly described.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various procedures which may be substantially represented in computer-readable media and so executed by a computer or processor, whether or not such computer or processor is explicitly shown.

With these fundamentals in place, we will now consider some non-limiting examples to illustrate various implementations of aspects of the present technology.

Figure 1:
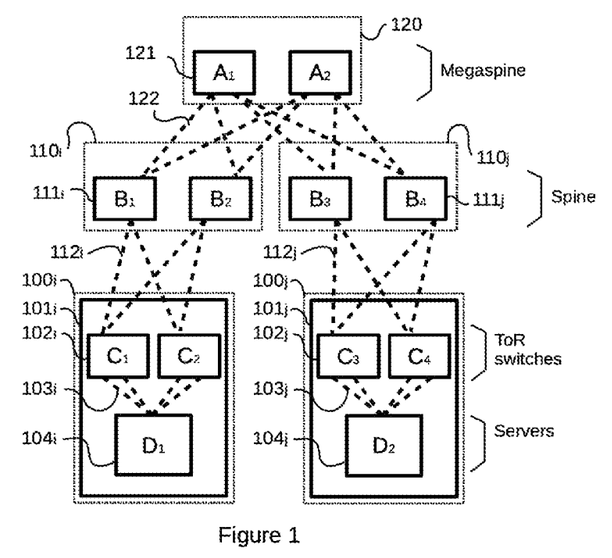
FIG. 1 depicts a networking topology that may be implemented in a datacenter.

Referring to FIG. 1, there is shown a networking topology that may be implemented in a datacenter. However, embodiments of the present technology can be equally applied to other types of datacenter networking topologies, as will be described in greater details herein below.

The depicted networking topology is of the known type «spine-leaf».

A megaspine 120 includes switches 121. The implementation of megaspine 120 is not particularly limited, even though two switches $A_1$ and $A_2$ are represented for simplification purposes. The megaspine in the datacenter network fabric may include one, or more than two switches.

A spine includes two spine modules $110_i$ and $110_j$, with each spine module including switches $111_i$ and $111_j$. The implementation of the spine and of the spine modules $110_i$ and $110_j$ is not particularly limited, even though two spine modules, and two switches per spine module, respectively $B_1$-$B_2$ and $B_3$-$B_4$, are represented for simplification purposes. The spine in the datacenter network fabric may include one, or more than two spine modules. A spine module may include one, or more than two switches.

Switches $A_1$ and $A_2$ interconnect with switches $B_1$-$B_4$ through links 122.

The hierarchy spine-megaspine is only one example: the topology and the datacenter network fabric may also have only one of spine or megaspine.

Leaves $100_i$ and $100_j$ each include respectively a rack $101_i$-$101_j$, Top of Rack («ToR») switches $102_i$-$102_j$, and servers $104_i$-$104_j$.

The implementation of the leaves $100_i$ and $100_j$ is not particularly limited, even though two leaves, two switches per leaf, respectively $C_1$-$C_2$ and $C_3$-$C_4$, and one server, respectively $D_1$ and $D_2$ are represented for simplification purposes. One, or more than two leaves may be implemented in the datacenter topology. A rack may include one, or more than two ToR switches, and more than one server.

ToR switches $C_1$-$C_2$ and $C_3$-$C_4$ interconnect respectively with switches $B_1$-$B_2$ and $B_3$—$B_4$ through respectively links $112_i$ and $112_j$, and with servers $D_1$-$D_2$ through respectively links $103_i$ and $103_j$.

The number of ports per switch $A_i$, $B_i$ or $C_i$, and the number of links 122, or $112_i$-$112_j$ may be different. For example, the represented redundancy may not actually be implemented, without departing from the scope of the present technology.

Conversely, Multi Chassis Link Aggregation may be used between two ToR switches in a rack (not represented on FIG. 1), allowing to interconnect them and use them as one logical switch for the purpose of L2 protocol.

It is to be noted that switches $A_i$, $B_i$ and $C_i$ may be of a different vendor, or of a different model from the same vendor, without departing from the scope of the present technology.

It is further to be noted that the configuration of ToR switches $C_i$ may involve asymmetry between two ToR switches on the same rack (not represented on FIG. 1) without departing from the scope of the present technology: one ToR switch may not have the same configuration as the other ToR switch.

In the represented topology, leaf ToR switches $C_1$-$C_4$ mesh into the spine, forming the access layer that delivers network connection points for racks into the datacenter. Leaves $100_i$ and $100_j$ provide the immediate network device behind the servers $104_i$ and $104_j$ which receive L2 traffic that may have to be transmitted on to another leaf in the network fabric. Thus leaf ToR switches $C_1$-$C_4$ may be considered a Network Virtualization Endpoint («NVE»), as an entry point/exit point to/from the overlay datacenter network. In this context, an NVE is datacenter network entity that sits at the edge of an underlay network and implements L2 and/or L3 network virtualization functions. The datacenter network-facing side of the NVE uses the underlying L3 network to tunnel tenant frames to and from other NVEs. The tenant-facing side of the NVE sends and receives Ethernet frames to and from individual servers.

Figure 2:
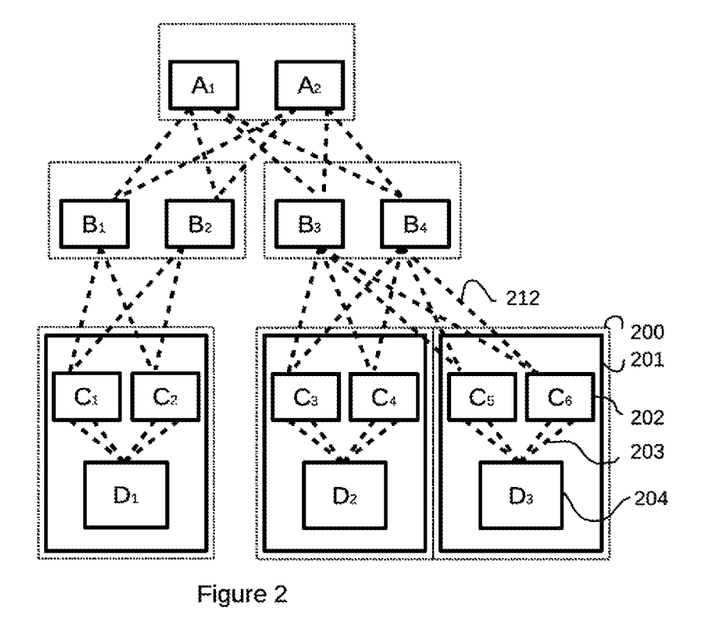
FIG. 2 depicts a new rack being added to the datacenter having the networking topology as in FIG. 1.

Referring to FIG. 2, there is shown a new rack being added to the datacenter having the networking topology as in FIG. 1. Added elements only compared to those represented on FIG. 1, are being attributed a new reference numeral.

A logical leaf 200 may be added, with physical rack 201 being added. Rack 201 includes two ToR switches 202 and one server 204. The implementation of rack 201 is not particularly limited, and may include one, or more than two ToR switches 202, and more than one server 204.

ToR switches $C_5$-$C_6$ interconnect with server $D_3$ through links 203. Before the new rack 201 is being added to the datacenter, links 203 are already physically wired.

ToR switches $C_5$-$C_6$ interconnect with switches $B_3$-$B_4$ through links 212. When a new rack 201 is to be added to the datacenter, it has to be deployed and configured, notably links 212 have yet to be both physically wired and logically configured to operate with the datacenter network, as will be described in greater details herein below.

As mentioned before, the number of ports per switch $C_1$ and the number of links 212 may be different from as represented, without departing from the scope of the present technology.

Before a new rack 201 is to be added to the datacenter, it is being manufactured and assembled. This may be done locally at the datacenter, or remotely. Each new rack may have different IHS populating it. Rack profiles may be created, for example depending on the services provided in the datacenter, and each new rack may be associated with one particular rack profile. The number and variety of rack profiles is not particularly limited, nor is the amount and variety of information associated with each rack profile, nor is the way the association is made between each new rack and a particular rack profile.

For example, four rack profiles may be defined, indicative in particular of the IHS populating the rack as follows:

TABLE 1

| Profile | Indication of IHS on new rack (as regard ToR switches) |
|---|---|
| Public networking | 2 ToR switches with 48 × 10 G ports + 1 ToR switch for uncritical IPMI |
| Private big storage | 1 ToR switch 21 × 40 G + 1 ToR switch for uncritical IPMI |
| Private small storage | 2 ToR switches with 48 × 10 G ports + 1 ToR switch for critical IPMI |
| Private virtualization servers | 2 ToR switches with 96 × 10 G ports |

Any number of rack profiles may be created, tailored to the needs of the organization controlling and maintaining the datacenter. As will be appreciated by the person skilled in the art, «critical/uncritical» is being used in Table 1 to indicate whether the associated IPMI («Intelligent Platform Management Interface») ToR switch needs to be configured or not, before the new rack may be deployed in the datacenter.

As for the amount and variety of information associated with each rack profile, minimal rack profile information may be had. For example, the following granularity for the minimal rack profile information may be adopted:

TABLE 2

| | IHS on rack/datacenter information | Field |
|---|---|---|
| 1 | Servers on rack | Number of |
| 2 | | Number of ports per server |
| 3 | | Speed of ports per server |
| 4 | | Port aggregation scheme if any |
| 5 | ToR switches on rack | Identification |
| 6 | | Number of |
| 7 | | Number of ports per switch |
| 8 | | Vendor per switch |
| 9 | | Model per switch |
| 10 | | Function/role per switch |
| 11 | Datacenter to which | Physical location |
| 12 | rack is to be added | Physical location of rack within datacenter |
| 13 | | Closest spine in datacenter |

In relation to certain rows of Table 2, the following comments may be made, by reference to the numerals in the left column:

4—port-aggregation scheme, if any, may refer to a set of datacenter internal rules and constraints related to best practices for achieving load balancing, redundancy or resiliency;

8—a ToR switch vendor may for example be: Cisco, Arista, Juniper, etc.;

9—a model may for example be 7280 from vendor Arista, etc.;

10—function/role may refer to for example public cloud, private cloud, out of band management, etc.;

13—the spine in closest proximity to the physical location of the rack to be added to the datacenter, constitutes an ingress and egress point for network traffic traveling between the ToR switches (once wired and configured) on the rack and the rest of the datacenter network.

To some extent, certain field values in the minimal rack profile information may be inferred from the value in certain other fields. For example, the number of ToR switches (in row 6) and the number of ports per switch (in row 7) may have a deterministic relation with the number of servers (in row 1), the number of ports per server (in row 2), and the service provided by the rack in the datacenter. In another example, the closest spine in datacenter (in row 13) may be inferred from the physical location of the datacenter (in row 11) and/or the physical location of rack within the datacenter (in row 12). Each rack profile defined by and for the organization controlling and maintaining the datacenter, such as those profiles found in Table 1, has a standard set of values for Table 2.

Specific values for Table 2 associated with a new rack 201, are entered at the time of its manufacturing and assembly. For example, a new rack 201 to be added as a storage rack to a datacenter located in Roubaix (France) with a topology as depicted in FIG. 1 may have the minimal rack profile information (row numbers refer to those of Table 2):

TABLE 3

|   | Switch/rack value | Switch/rack value |
|---|---|---|
| 1 | 2 × 21 | 2 × 21 |
| 2 | 1 | 1 |
| 3 | 10 G | 10 G |
| 4 | None | None |
| 5 | C5 | C6 |
| 6 | 2 | 2 |
| 7 | 21 + 2 + 2 | 21 + 2 + 2 |
| 8 | Arista | Arista |
| 9 | 7280 | 7280 |
| 10 | Storage | Storage |
| 11 | Roubaix | Roubaix |
| 12 | Building 2, Room 5, Cell A05C12 | Building 2, Room 5, Cell A05C12 |
| 13 | Spine $110_j$ | Spine $110_j$ |

As for the association between each new rack and a particular rack profile information, for example a serial number affixed on the new rack 201 at the time of its manufacturing and assembly may be associated in a rack assembly database to the rack profile and its minimal rack profile information. The rack assembly database may for example be accessible through an Application Programming Interface («API»).

Figure 3:
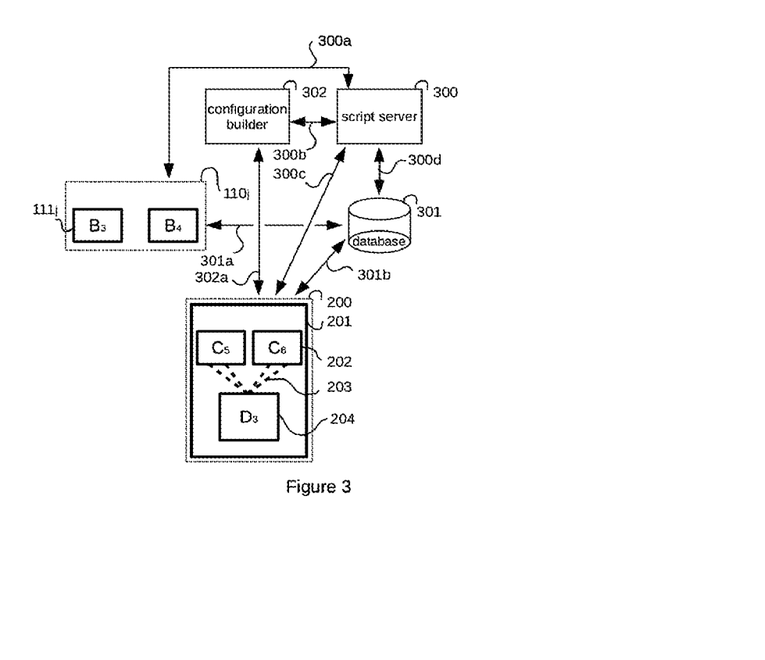
FIG. 3 depicts the system according to an embodiment of the present technology.

FIG. 3 depicts the system according to an embodiment of the present technology. Elements that are identical to elements present in FIG. 1 or FIG. 2 bear the same reference numerals.

Generally speaking, a script server 300, a database 301 and a configuration builder 302 may be implemented for the present technology. The person skilled in the art will appreciate both that the representation in FIG. 3 is a logical representation without reference to a particularly necessary corresponding hardware implementation, and that other equivalent logical implementations may be had without departing from the scope of the present technology. In particular, script server 300, and/or database 301 and/or configuration builder 302 may be integrated in single IHS, an exemplary description being provided further down in relation to FIG. 6.

Generally, the script server 300 may:
through links $300_d$, read/write the database 301;
through links $300_c$, receive/request information from/to servers 202 of the new rack 201 to be added to the datacenter;
through links $300_a$ receive/request information from/to switches $111_j$ of spine $110_j$; and
through links $300_b$ receive/request information from/to the configuration builder 302.

Generally, the configuration builder 302 may push configurations to ToR switches 202 of the new rack 201 through links $302_a$ upon commands received from the script server 300.

Generally, the database 301 may store:
information about the spine $110_j$ through links $301_a$;
the minimal and enriched (as explained below) rack profile information for new rack 201 through links $301_b$; and
other information as stored by the script server 300.

Figure 4A:
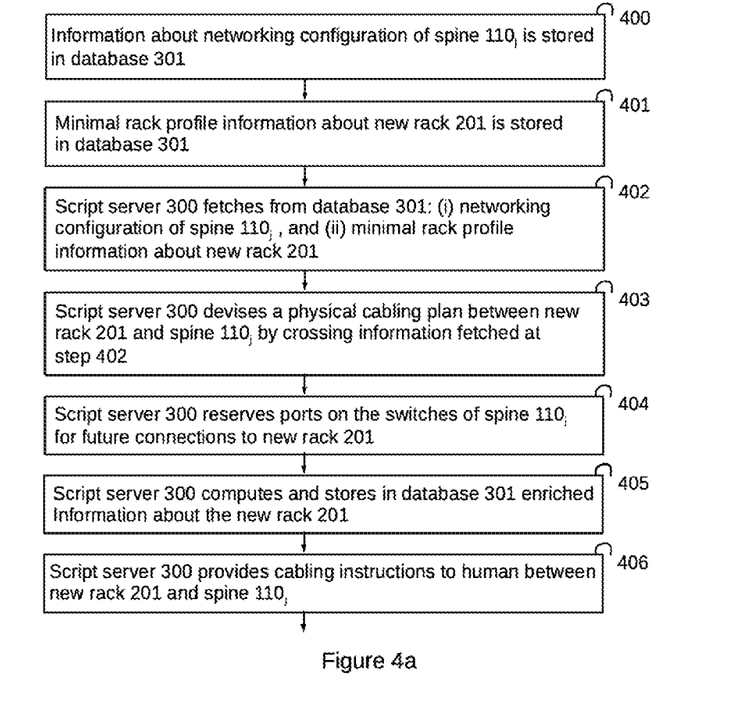
FIG. 4*a*-4*b* depicts examples of procedures executed by the system of FIG. 3 to provide the method according to an embodiment of the present technology.
Figure 4B:
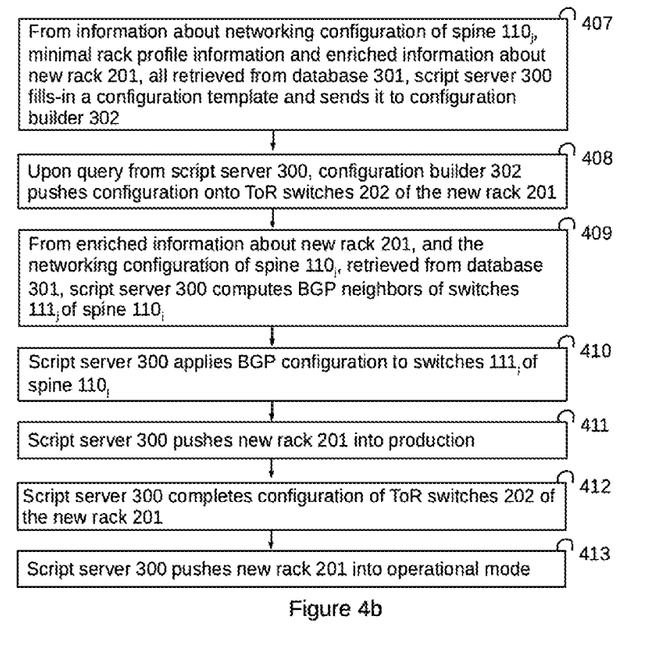

Turning now to procedures to be executed, examples of how the script server 300, the database 301 and the configuration builder 302 may be configured to execute at least some of a plurality of procedures for performing the method of the present technology, are disclosed in relation to FIG. 4a-4b.

Generally speaking, information about the datacenter network is maintained as the datacenter grows, describing in particular the function, state, address, port status and configuration of, and links between, switches forming the datacenter network. Part or all of that information may be stored in database 301. In an embodiment, at step 400, information about the networking configuration of spine $110_j$ only is stored in database 301.

For example, the following granularity for the networking configuration of spine $110_j$ may be adopted, for each switch forming the spine:

TABLE 4

|   | Networking configuration of spine $110_j$ | Field |
|---|---|---|
| 1 | Switch | Identification |
| 2 |  | Vendor |
| 3 |  | Model |
| 4 |  | Identification of other switch(es) in spine |
| 5 |  | Ports available/busy |
| 6 |  | BGP configuration (ASN and IP address(es)) |
| 7 |  | Mode |

In relation to certain rows of Table 4, the following comments may be made, by reference to the numerals in the left column:
4—in a particular embodiment as described in relation to FIG. 1, the spine and megaspine each have two switches, as a design choice for the datacenter network: one or more than two switches could form spine/megaspine in other embodiments;
5—the current cabling of switches $111_j$ of spine $110_j$ may thus be inferred, along with what ports are still available for connecting the new rack 201;
7—for example: «provisioning», «available», «delivered»; it will be appreciated by the person skilled in the art that a new rack may be connected to a spine switch that is in an operational mode only.

For example, the following values may be had for the two switches $111_j$ in spine $110_j$ as depicted on FIG. 1 (row numbers refer to those of Table 4):

TABLE 5

|   | Spine switch values | Spine switch values |
|---|---|---|
| 1 | B3 | B4 |
| 2 | Arista | Arista |
| 3 | DCS-7280QR-C36-F | DCS-7508N |
| 4 | B4 | B3 |
| 5 | Available ports: 13, 18 | Available ports: 1-10, 22 |
| 6 | 4291000002; 192.168.80.18/32; 192.168.0.250 | 4291000002; 192.168.80.18/32; 192.168.0.254 |
| 7 | Delivered | Delivered |

Going back to FIG. 4a, the minimal rack profile information for the new rack 201 is stored in database 301. For example, the new rack 201's serial number may be read as is known by an image scanning device (e.g., bar code reader) or by an nfc device, etc. The association with the new rack 201's minimal rack profile information may for example be made through the rack assembly database API.

At step 402, script server 300 fetches from database 301 both information about the networking configuration of spine $110_j$, and new rack 201's minimal rack profile information.

At step 403, script server 300 crosses information about the networking configuration of spine $110_j$, and new rack 201's minimal rack profile information, and devises a physical cabling plan between new rack 201 and the switches $111_j$ of spine $110_j$. The cabling plan may for example be computed by allocating the ports of ToR switches 202 of new rack 201 to available ports of the switches $111_j$ of spine $110_j$ (as known from the Networking configuration of spine 110 for example per Table 4 above).

It is to be noted that port allocation by script server 300 for interconnection between switches 202 of new rack 201 and switches $111_j$ of spine $110_j$ may be by simply allocating ports in the order of their numbering in the switch. Alternatively or in addition, allocation takes into account a set of datacenter internal rules and constraints relative to cabling conventions. These may for example be best practices for ensuring load or traffic balancing, redundancy and resiliency of the network, etc.

At step 404, script server 300 reserves ports on the switches $111_1$ of spine $110_j$, among the available ports, for future connections to the new rack 201.

At step 405, script server 300 computes and stores in database 301 a set of rack enriched information about the new rack 201. For example, the following granularity for the rack enriched information may be adopted:

TABLE 6

| | IHS on rack/datacenter interconnection | Field |
|---|---|---|
| 1 | ToR switches on rack | Identification |
| 2 | | ASN (identical for all ToR switches on rack) |
| 3 | | Initial state |
| 4 | | IP address for configuration and management |
| 5 | Full physical cabling plan | Port interconnections |

In relation to certain rows of Table 6, the following comments may be made, by reference to the numerals in the left column:

2—Script server 300 selects an Autonomous System Number ("ASN") that is not already in use in the datacenter network; this ASN is unique for the rack 201/leaf 200; it may for example be comprised between 4200000000 and 4294967294, as an IP address that may be reserved for private use;

4—Script server 300 selects an IP address for each ToR switch 202. From the minimal rack profile information, script server 300 deducts a range of available IP addresses, and may for example pick the first one in the order of IP addresses.

5—As per step 403 (script server 300 allocates ports for interconnection between switches 202 of new rack 201 and switches $111_j$ of spine $110_j$) and step 404 above (script server 300 reserves ports on the switches $111_j$ of spine $110_j$), the full port interconnection plan is known and may be entered as rack enriched information into database 301.

For example, the following values may be had for the two switches in new rack 201 as depicted on FIG. 2 (row numbers refer to those of Table 6):

TABLE 7

| | ToR switch values | ToR switch values |
|---|---|---|
| 1 | C5 | C6 |
| 2 | 4290000019 | 4290000019 |

TABLE 7-continued

| | ToR switch values | ToR switch values |
|---|---|---|
| 3 | Provisioning | Provisioning |
| 4 | 10.96.208.69 | 10.96.208.70 |
| 5 | Port 11 to port 13 of B3 | Port 13 to port 18 of B3 |
| | Port 24 to port 8 of B4 | Port 7 to port 22 of B4 |

Going back to FIG. 4a, at step 406 script server 300 provides instructions, for example to a datacenter technician, for physical cabling instructions between the new rack 201 and switches $111_j$ of spine $110_j$. As is know, this may be done through a user interface where the cabling is graphically represented. Augmented reality may also be used to aid the datacenter technician with the cabling. At this point, the datacenter technician cables and wires according to the instructions given to it.

At step 407 (FIG. 4b), script server 300 fetches from database 301: information about the networking configuration of spine $110_j$, minimal rack profile information and rack enriched information about new rack 201, and fills-in a configuration template toward having the configuration builder configure ToR switches 202 of the new rack 201. Indeed, once the physical cabling is realized, logical configuration is being performed. In particular BGP pre-configuration of the ToR switches 202 is made possible by the known BGP configuration of the switches $111_j$. The template is a file readable by ToR switches 202, and its content and form may therefore be affected by factors such as switch vendor, model, and/or function/role. As is know, the language JINJA2 may for example be used as a template engine for the Python programming language. A configuration script tailored to each ToR switch 202 may thus be built. The ToR switch 202 configuration as is known, may for example cover aspects such as vlan configuration, etc.

In an embodiment, ToR switches 202 may be configured so as to be able to exchange directly with one another. This may be done in the already mentioned context of Multi Chassis Link Aggregation (not represented on FIG. 1), whereby ToR switches 202 within new rack 201 may communicate with one another without going through the datacenter network and spine $110_j$.

At step 408, upon query from the script server 300, the configuration builder 302 generates from the template the actual configuration lines of code, and pushes their configuration onto the ToR switches 202. This may for example be done, as is known, using a DHCP server. Zero Touch Provisioning or its equivalent may be used, as is also known, depending on the vendor/model of ToR switches 202.

It is to be noted that the aforementioned configuration represents the minimum configuration required for the ToR switches 202 to reach production level in the datacenter. Following that and post-production, script server 300 may subsequently connect directly (e.g. without going through the configuration builder 302) to ToR switches 202 and push onto them additional configuration as will be described in greater details below.

At step 409, script server 300 computes BGP neighbors of switches $111_j$ of spine $110_j$. This is made possible through the switch IP addresses for configuration and management, and the full physical cabling plan computed and stored at step 405 as enriched rack profile information. This information is retrieved from database 301 by script server 300.

At step 410, script server 300 applies their BGP configuration to the switches $111_j$ of spine $110_j$. At this point, communication channels become open in the datacenter network, and it is configured so as to permit ToR switches 202 and the new rack 201 to join as a network leaf.

At step 411, script server 300 may then push new rack 201 into production mode in the datacenter. The new rack 201 is not in operational mode yet, but the production mode implies that script server 300 may now connect directly to ToR switches 202 to complete their configuration and push them into operational mode.

At step 412, script server 300 may complete the configuration of ToR switches 202. For example a change of vlan environment may be effected, thus isolating the production process from the operational mode and allowing to comply with the PCI-DSS security standards for the datacenter. Another example may be configuration of a more dynamic nature such as that related to management of personnel access authorizations.

At step 413, script server 300 may push the new rack 201 into operational mode in the datacenter.

It is contemplated that procedures other than those non-exhaustively depicted in FIG. 4*a*-4*b* may be implemented, without departing from the scope of the present technology.

The described method and procedures allow to optimize the installation of a new rack in a datacenter by:
- providing a multi-vendor automation framework so that a single datacenter technician (instead of for example, people from three different teams) may be autonomous for the whole installation process, without recourse to competences other than as required for physically wiring the new rack, such as through cooling and electrical connections;
- reducing drastically the installation lead time (for example from days to hours) by optimizing the configuration time of the new rack ToR switches;
- increasing the predictability of lead time installations by ensuring consistency and reliability of procedures;
- reducing drastically the susceptibility to errors of the installation process;
- allowing for the installation of added new racks while still complying with PCI-DSS security standards.

As the installation results are better (lead-time, errors) and more predictable, fewer racks need to be manufactured and assembled in preparation for the same datacenter growth rate, thus reducing capital expenditure for the operator of the datacenter.

Figure 5A:
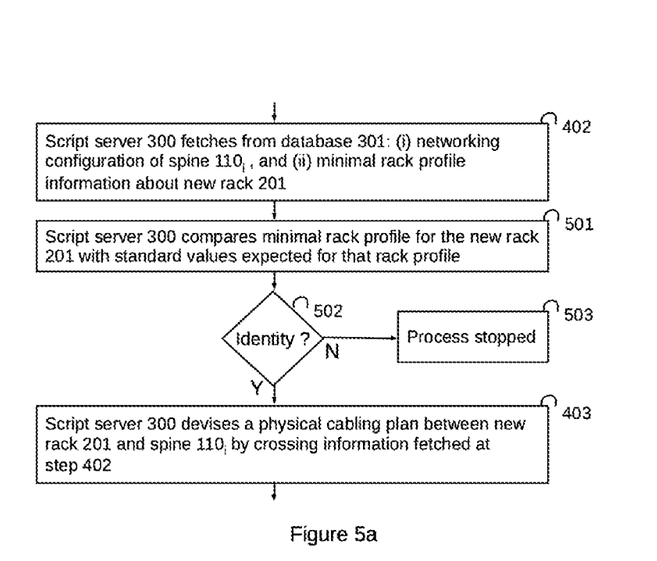
FIG. 5a-5c depicts examples of status checks that may be executed in-between selected procedures of FIG. 4a-4b.
Figure 5B:
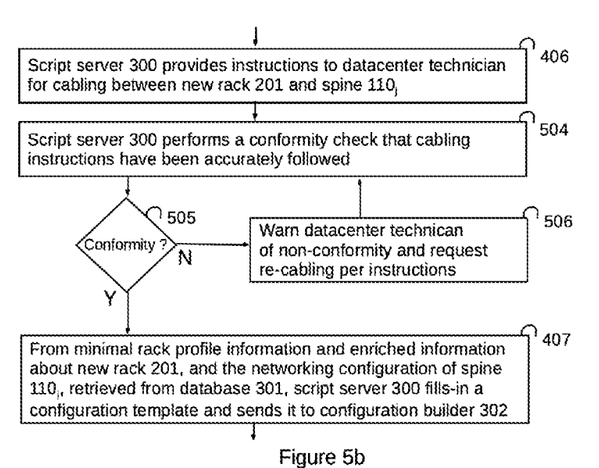
Figure 5C:
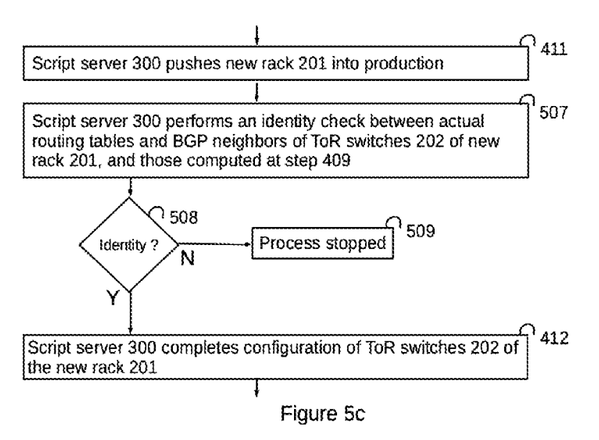

In addition, as described in greater details below, checkpoints may be provided at various steps of the deployment and configuration process of a new rack, reducing further the possibility of an error to go unnoticed before the new rack gets into operational mode. Generally speaking, status checks may be initiated and performed by the script server 300, and may result in either automatic correction, rolling back of the installation process, or a halt requiring human intervention. More particularly:
- as depicted FIG. 5*a*, a general hardware compatibility check may be performed for new rack 201 before rack enriched information is computed and stored at step 405. In particular and for example, the minimal rack profile information retrieved at step 402 may be compared with standard values for the corresponding rack profile (Table 2 above): if any mismatch is detected, it means at the time of manufacturing and assembly, the new rack 201 was populated with IHS that does not correspond to the expected IHS for that rack profile, and the new rack 201 installation process may be stopped. On FIG. 5*a*, this status check is illustrated with a comparison step 501, and an information identity check at steps 502 and 503, in-between steps 402 and 403 from FIG. 4*a*.
- as depicted FIG. 5*b*, a general cabling conformity check may be performed that the datacenter technician has accurately followed instructions received at step 406. In particular and for example, as the datacenter technician physically cables ports of ToR switches 202 of the new rack 201 and switches 111$_j$ of spine 110$_{j'}$, all these switches may make use of the Link Layer Discovery Protocol («LLDP») protocol on the cabled ports to exchange L2 networking information and discover the identity of the other switches and their used ports. This information may in turn be collected by the script server 300 from the ToR switches 202 and the switches 111$_{j'}$, and compared with the rack enriched information computed at step 405, particularly the Full physical cabling plan/Port interconnections field. This results in checking L1 status using L2 information. On FIG. 5*b*, this status check is illustrated with a comparison step 504, a cabling instruction conformity check at step 505, and as the case may be a loop back to step 504 after a warning to the datacenter technician at step 506, all in-between steps 406 and 407 from FIGS. 4*a* and 4*b*.
- as depicted FIG. 5*c*, a check may be made generally that BGP sessions are correctly mounted with neighbors of the switches 202 of new rack 201. In particular, post-production, script server 300 may connect directly to ToR switches 202 of new rack 201 to check that their actual routing tables and BGP neighbors are identical to those computed at step 409. Identity means the new rack 201 is properly cabled, L2 and L3 functionalities are readily available, and the new rack 201 is ready for operational mode in the fabric of the datacenter. On FIG. 5*c*, this status check is illustrated with steps 507 and 508 of identity check, and a step of stopping the new rack installation process if there is no identity. All such steps in-between steps 411 and 412 from FIG. 4*b*.

The status checks above may be all performed cumulatively, or selectively with only certain of them being performed, without departing from the scope of the present technology.

Although the operations of some of the disclosed procedures, status checks and methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods may be used in conjunction with other methods.

Any of the disclosed procedures, status checks and methods may be implemented as computer-executable instructions stored on one or more computer-readable storage media and executed on a computer. The computer-executable instructions may be part of, for example, a dedicated software application or a software application that is accessed or downloaded via a web browser or other software application such as a remote computing application. Such software may be executed, for example, on a single local computer, or in a network environment using one or more network computers.

Figure 6:
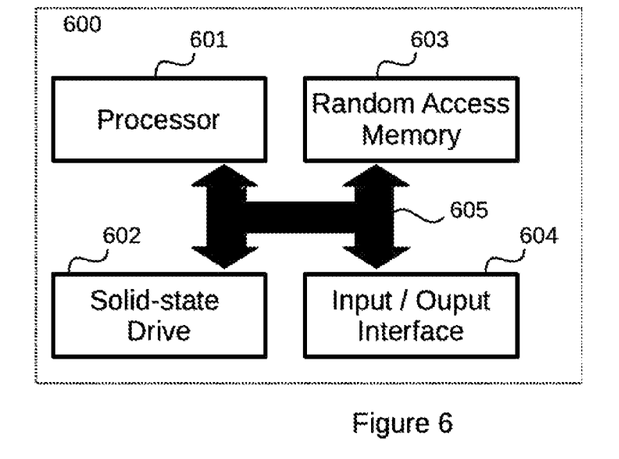
FIG. 6 depicts an exemplary implementation of an IHS that may be used to execute the procedures and status checks according to the present technology.

FIG. 6 depicts an exemplary implementation of an IHS that may be used to execute the procedures, status checks and methods according to the present technology. As will be appreciated by the person skilled in the art, such IHS may be implemented in any other suitable hardware, software, and/or firmware, or a combination thereof, and may be a single physical entity, or several separate physical entities with a distributed functionality.

In some embodiments, the IHS may be an IHS 600 comprising various hardware components including one or more single or multi-core processors collectively represented by a processor 601, a solid-state drive 602, a random access memory 603 and an input/output interface 604. In some embodiments, the IHS 600 may also be a sub-system of one of the above-listed systems. In some other embodiments, the IHS 600 may be an "off the shelf" generic computer system. In some embodiments, the IHS 600 may also be distributed amongst multiple systems. The IHS 600 may also be specifically dedicated to the implementation of the present technology. As a person in the art of the present technology may appreciate, multiple variations as to how the IHS 600 is implemented may be envisioned without departing from the scope of the present technology.

Communication between the various components of the IHS 600 may be enabled by one or more internal and/or external buses 605 (e.g. a PCI bus, universal serial bus, IEEE 1394 "Firewire" bus, SCSI bus, Serial-ATA bus, ARINC bus, etc.), to which the various hardware components are electronically coupled.

The input/output interface 604 may allow enabling networking capabilities such as wire or wireless access. As an example, the input/output interface 604 may comprise a networking interface such as, but not limited to, a network port, a network socket, a network interface controller and the like. Multiple examples of how the networking interface may be implemented will become apparent to the person skilled in the art of the present technology. According to implementations of the present technology, the solid-state drive 602 stores program instructions, such as those part of, for example, a library, an application, etc. suitable for being loaded into the random access memory 603 and executed by the processor 601 for the procedures and status checks according to the present technology.

For clarity, only certain selected aspects of the software-based implementations are described. Other details that are well known in the art are omitted. For example, it should be understood that the disclosed technology is not limited to any specific computer language or program. Likewise, the disclosed technology is not limited to any particular computer or type of hardware. Certain details of suitable computers and hardware are well known and need not be set forth in detail in this disclosure. It should also be well understood that any functionality described herein may be performed, at least in part, by one or more hardware logic components, instead of software. For example, and without limitation, illustrative types of hardware logic components that may be used include FPGA or ASIC, etc.

Modifications and improvements to the above-described implementations of the present technology may become apparent to those skilled in the art. The disclosed procedures, status checks, methods, apparatus, and systems are not limited to any specific aspect or feature or combination thereof, nor do the disclosed embodiments require that any one or more specific advantages be present or problems be solved. The foregoing description is intended to be exemplary rather than limiting. The scope of the present technology is therefore intended to be limited solely by the scope of the appended claims.

The invention claimed is:

1. A method for pushing a new rack equipped with at least one Top of Rack (ToR) switch into operational mode in a datacenter equipped with at least one datacenter switch that is in operational mode, comprising:
    fetching, by a script server, and from a database:
        information about a first networking configuration of the at least one datacenter switch; and
        a minimal profile information of the new rack;
    devising by the script server, based on the information about the first networking configuration of the at least one datacenter switch and the minimal profile information of the new rack, a physical cabling plan between the at least one ToR switch and the at least one datacenter switch;
    reserving, by the script server, available ports on the at least one datacenter switch to be connected to ports of the at least one ToR switch according to the physical cabling plan;
    computing and storing, by the script server and into the database, enriched information of the new rack based on ports interconnecting the at least one datacenter switch and the at least one ToR switch, and the physical cabling plan;
    providing, by the script server, cabling instructions relative to the physical cabling plan to a datacenter technician;
    filling-in, by the script server, and based on information about the first networking configuration of the at least one datacenter switch, and the minimal profile information and the enriched information of the new rack, a configuration template and sending it to a configuration builder;
    generating, by the configuration builder, upon query by the script server, a networking configuration of the at least one ToR switch based on the filled-in configuration template, and pushing the networking configuration of the at least one ToR switch onto the at least one ToR switch;
    computing and applying, by the script server, and based on the enriched information of the new rack and information about the first networking configuration of the at least one datacenter switch, a second networking configuration to the at least one datacenter switch;
    pushing, by the script server, the new rack into production mode, whereby the script server may connect directly to the at least one ToR switch;
    completing, by the script server, the networking configuration of the at least one ToR switch; and
    pushing, by the script server, the new rack into operational mode in the datacenter.

2. The method of claim 1 further comprising: comparing, by the script server, the minimal profile information of the new rack with standard values for a corresponding rack profile, and if there is no identity between the two, stopping the method.

3. The method of claim 1 further comprising: performing, by the script server, a conformity check that the cabling instructions relative to the physical cabling plan have been accurately followed by the datacenter technician, and if not, warning the datacenter technician of a non-conformity and requesting re-cabling.

4. The method of claim 1 further comprising: performing, by the script server, an identity check between actual routing tables and Border Gateway Protocol (BGP) neighbors of the at least one ToR switch with the second networking configuration, and if there is no identity between the two, stopping the method.

5. The method of claim 1 wherein the minimal profile information of the new rack comprises a port-aggregation scheme which refers to a set of datacenter internal rules and constraints related to best practices for achieving load balancing, redundancy or resiliency in the datacenter.

6. The method of claim 1 wherein the devising by the script server the physical cabling plan takes into account a set of datacenter internal rules and constraints relative to cabling conventions.

7. The method of claim 1 wherein the providing by the script server the cabling instructions comprises graphically representing the cabling instructions on a user interface to the datacenter technician.

8. The method of claim 7 wherein the graphically representing comprises showing an augmented reality to aid the datacenter technician with cabling.

9. The method of claim 1 further comprising:
affixing a serial number on the new rack at the time of its manufacturing and assembly; and
associating, in the database, the serial number with the minimal profile information of the new rack.

10. The method of claim 1 wherein the at least one datacenter switch is part of a spine, and wherein the at least one ToR switch becomes part of a leaf after being pushed into operational mode, in a spine-leaf networking topology of the datacenter.

11. A system comprising at least one processor and memory storing a plurality of executable instructions which, when executed by the at least one processor, cause the system to:
fetch, from a database:
information about a first networking configuration of at least one datacenter switch in a datacenter, and
a minimal profile information of a new rack with at least one Top of Rack (ToR) switch;
devise, based on the information about the first networking configuration of the at least one datacenter switch and the minimal profile information of the new rack, a physical cabling plan between the at least one ToR switch and the at least one datacenter switch;
reserve available ports on the at least one datacenter switch to be connected to ports of the at least one ToR switch according to the physical cabling plan;
compute and store enriched information of the new rack based on ports interconnecting the at least one datacenter switch and the at least one ToR switch and the physical cabling plan;
provide cabling instructions relative to the physical cabling plan to a datacenter technician;
fill-in, based on information about the first networking configuration of the at least one datacenter switch, and the minimal profile information and the enriched information of the new rack, a configuration template;
generate a networking configuration of the at least one ToR switch based on the filled-in configuration template;
push the networking configuration of the at least one ToR switch onto the at least one ToR switch;
compute and apply, based on the enriched information of the new rack and information about the first networking configuration of the at least one datacenter switch, a second networking configuration to the at least one datacenter switch;
push the new rack into production mode;
connect directly to the at least one ToR switch;
complete the networking configuration of the at least one ToR switch; and
push the new rack into operational mode in the datacenter.

12. The system of claim 11, wherein the system comprises a script server and a configuration builder.

13. The system of claim 11, wherein the system comprises a script server and the database.

14. The system of claim 11, wherein the new rack is equipped with at least two ToR switches, and a Multi Chassis Link Aggregation is established between the at least two ToR switches.

15. A non-transitory computer-readable medium comprising instructions which, when executed by at least one processor, cause the at least one processor to:
fetch, from a database:
information about a first networking configuration of at least one datacenter switch in a datacenter, and
a minimal profile information of a new rack with at least one Top of Rack (ToR) switch;
devise, based on the information about the first networking configuration of the at least one datacenter switch and the minimal profile information of the new rack, a physical cabling plan between the at least one ToR switch and the at least one datacenter switch;
reserve available ports on the at least one datacenter switch to be connected to ports of the at least one ToR switch according to the physical cabling plan;
compute and store enriched information of the new rack based on ports interconnecting the at least one datacenter switch and the at least one ToR switch and the physical cabling plan;
provide cabling instructions relative to the physical cabling plan to a datacenter technician;
fill-in, based on information about the first networking configuration of the at least one datacenter switch, and the minimal profile information and the enriched information of the new rack, a configuration template;
generate a networking configuration of the at least one ToR switch based on the filled-in configuration template;
push the networking configuration of the at least one ToR switch onto the at least one ToR switch;
compute and apply, based on the enriched information of the new rack and information about the first networking configuration of the at least one datacenter switch, a second networking configuration to the at least one datacenter switch;
push the new rack into production mode;
connect directly to the at least one ToR switch;
complete the networking configuration of the at least one ToR switch; and
push the new rack into operational mode in the datacenter.

* * * * *